US012619197B2

(12) United States Patent
Zhang et al.

(10) Patent No.: US 12,619,197 B2
(45) Date of Patent: May 5, 2026

(54) WATCH ASSEMBLY

(71) Applicant: SHENZHEN CIGA DESIGN CO., LTD., Shenzhen (CN)

(72) Inventors: Jianmin Zhang, Shenzhen (CN); Xin Jiang, Shenzhen (CN)

(73) Assignee: SHENZHEN CIGA DESIGN CO., LTD., Shenzhen (CN)

( * ) Notice: Subject to any disclaimer, the term of this patent is extended or adjusted under 35 U.S.C. 154(b) by 374 days.

(21) Appl. No.: 18/393,629

(22) Filed: Dec. 21, 2023

(65) Prior Publication Data

US 2025/0164933 A1 May 22, 2025

(30) Foreign Application Priority Data

Nov. 16, 2023 (CN) ......................... 202311528175.5

(51) Int. Cl.
*G04B 19/02* (2006.01)
*G04B 19/08* (2006.01)
*G04B 37/22* (2006.01)

(52) U.S. Cl.
CPC ............. *G04B 19/02* (2013.01); *G04B 19/08* (2013.01); *G04B 37/22* (2013.01)

(58) Field of Classification Search
CPC ........ G04B 19/02; G04B 19/08; G04B 37/22; G04B 19/223; G04B 19/22; G04B 29/00; G04B 33/04; G04B 29/04; G04B 37/0008; G04B 37/00; G04B 1/00; G04B 13/00; G04C 17/005
USPC ............................................................ 368/27
See application file for complete search history.

(56) References Cited

U.S. PATENT DOCUMENTS 5,586,089 A * 12/1996 McGarvey ......... G04B 45/0007 368/233
6,134,186 A * 10/2000 Jang ..................... G04B 19/223 368/27
8,787,118 B2 * 7/2014 Beccia ................... G04B 19/22 368/27
2005/0105397 A1 * 5/2005 Tuason ................ G04B 19/262 368/21

(Continued)

FOREIGN PATENT DOCUMENTS

CN 103425037 A 12/2013
CN 105278456 A 1/2016
CN 115407714 A 11/2022

*Primary Examiner* — Sean Kayes
(74) *Attorney, Agent, or Firm* — Nitin Kaushik

(57) ABSTRACT

The present invention discloses a watch assembly and belongs to the technical field of watch assemblies. The watch assembly includes a watch case; a case back mounted in the watch case; a minute hand dial mounted inside the watch case, where a surface of the minute hand dial is provided with a first indicating portion. According to the present invention, the case back is mounted to the watch case, and when structures inside the watch case need to be inspected and maintained, the case back can be conveniently opened. It should be noted that gear structures inside the watch case of the present invention are integrated into a detachable mounting assembly, the user can directly disassemble the detachable mounting assembly from the watch case, and then opens the detachable mounting assembly to inspect and maintain the gear structures inside the watch case.

10 Claims, 9 Drawing Sheets

(56) References Cited

U.S. PATENT DOCUMENTS

| | | | | |
|---|---|---|---|---|
| 2010/0091616 | A1* | 4/2010 | Bonhoff | G04C 17/005 368/80 |
| 2012/0075960 | A1* | 3/2012 | Sun | G04B 19/223 368/21 |
| 2013/0051193 | A1* | 2/2013 | Sato | G04B 19/046 368/205 |
| 2014/0064045 | A1* | 3/2014 | Bonhoff | G04B 45/0061 368/232 |
| 2018/0032034 | A1* | 2/2018 | Vuille | G04B 47/04 |
| 2019/0033785 | A1* | 1/2019 | Sayers | G04C 17/005 |
| 2019/0086870 | A1* | 3/2019 | Mitamura | G04B 19/202 |
| 2019/0146413 | A1* | 5/2019 | Lagorgette | G04B 19/046 368/37 |
| 2020/0387111 | A1* | 12/2020 | Fraser-Webb | G04B 19/06 |
| 2024/0160153 | A1* | 5/2024 | Kato | G04B 45/0084 |
| 2025/0291315 | A1* | 9/2025 | Merz | G04B 19/048 |
| 2026/0003324 | A1* | 1/2026 | Hirano | G04B 19/268 |

* cited by examiner

WATCH ASSEMBLY

CROSS-REFERENCE TO RELATED APPLICATIONS

The application claims priority to Chinese patent application No. 2023115281755, filed on Nov. 16, 2023, the entire contents of which are incorporated herein by reference.

TECHNICAL FIELD

The present invention belongs to the technical field of watches, and in particular to a watch assembly.

BACKGROUND

With the development of science and technology, a watch assembly is applied to people's lives and is worn by a user. The user wearing the watch assembly can read the current time displayed on the watch assembly. In the prior art, an hour hand dial and a minute hand dial are both fixed on a watch case, a hour hand and a minute hand rotate relative to the hour hand dial and the minute hand dial respectively, and are independent of each other. The hour hand, the minute hand, the hour hand dial and the hand minute dial together constitute a current time of the watch assembly. The hour hand indicates an hour, and the minute hand indicates a minute.

An internal gear of an existing watch assembly is mostly fixed by using some tiny screws and when inspection and maintenance are required, the existing watch assembly is not convenient to disassemble, and its maintenance efficiency is affected. Therefore, a watch assembly is proposed to solve the problem existing in the prior art, so that the watch assembly has an advantage of easy disassembly during gear repair.

SUMMARY

An objective of the present invention is to provide a watch assembly, to solve the problems in the forgoing background that in the prior art, an internal gear of a watch assembly is mostly fixed by using some tiny screws, and when inspection and maintenance are required, the existing watch assembly is not convenient to disassemble, and its maintenance efficiency is affected.

To achieve the foregoing objective, the present invention adopts the following technical solution.

A watch assembly includes: a watch case; a case back mounted in the watch case; a minute hand dial mounted inside the watch case, where a surface of the minute hand dial is provided with a first indicating portion; an hour hand dial disposed in an inner cavity of the watch case, where a surface of the hour hand dial is provided with a second indicating portion; a time reading module mounted in an inner cavity of the hour hand dial; and a movement module detachably mounted in the inner cavity of the watch case, where the movement module includes: a first drive assembly for driving the hour hand dial to rotate; a second drive assembly for driving the time reading module to rotate; a rotating assembly for driving the first drive assembly and the second drive assembly to rotate; and a detachable mounting assembly for integrating the rotating assembly, the first drive assembly, and the second drive assembly together to facilitate disassembly and maintenance.

Preferably, the time reading module includes a mounting seat rotatably connected to the inner cavity of the hour hand dial; a star-shaped pointer mounted on an inner cavity of the mounting seat and deviating from a center position; and a transparent cover plate mounted on a top of the mounting seat and used for protecting the star-shaped pointer.

Preferably, the first drive assembly includes a first drive shaft disposed in the inner cavity of the watch case, where a top end of the first drive shaft penetrates through the hour hand dial and is clamped to a bottom of the mounting seat; a second drive shaft disposed in the inner cavity of the watch case; a first gear and a second gear disposed in a fitting manner with the first drive shaft and the second drive shaft respectively, where the first gear and the second gear are meshed with each other; and a first clamping assembly for connecting the first gear and the hour hand dial together so that the hour hand dial is able to rotate following the first drive shaft.

Preferably, the first clamping assembly includes several groups of first clamping blocks fixedly mounted at a bottom of the hour hand dial; and a first clamping groove formed in a surface of the first gear, where a surface of the first clamping block is clamped to an inner wall of the first clamping groove.

Preferably, the second drive assembly includes: a third gear and a fourth gear disposed in a fitting manner with the first drive shaft and the second drive shaft respectively, where the third gear and the fourth gear are meshed with each other; and a connecting hole formed in the bottom of the mounting seat and adapted to the first drive shaft, where a top end of the first drive shaft is clamped to an inner wall of the connecting hole.

Preferably, the rotating assembly includes a crown rotatably connected to an outer side of the watch case; a rotating rod mounted on one side of the crown; a first bevel gear mounted at one end, away from the crown, of the rotating rod by using a second clamping assembly; and a second bevel gear meshed with the first bevel gear, where the second bevel gear and the second drive shaft are mounted in a fitting manner.

Preferably, the watch assembly further includes a through hole formed in surfaces of the first gear, the second gear, the third gear, the fourth gear and the second bevel gear, where limiting blocks are fixedly mounted on two sides of inner cavities of the through hole and the connecting hole, and limiting grooves adapted to the limiting blocks are formed in surfaces of the first drive shaft and the second drive shaft.

Preferably, the second clamping assembly includes a second clamping block fixedly mounted at one end, away from the crown, of the rotating rod; and a second clamping groove formed in one side of the first bevel gear, where a surface of the second clamping block is clamped to an inner wall of the second clamping groove.

Preferably, the detachable mounting assembly includes: a first connecting seat and a second connecting seat disposed in an inner cavity of the watch case; a third clamping assembly for clamping and fixing the first connecting seat and the second connecting seat together, and accommodating grooves formed in inner sides of the first connecting seat and the second connecting seat and adapted to the first gear, the second gear, the third gear, the fourth gear, the first bevel gear, the second bevel gear, the first drive shaft, the second drive shaft and the rotating rod.

Preferably, the third clamping assembly includes an elastic buckle fixedly mounted atone side of the first connecting seat; and a third clamping groove formed in one side of the second connecting seat and corresponding to the elastic buckle, where a surface of the elastic buckle is clamped to an inner wall of the third clamping groove.

The technical effects and advantages of the present invention are as follows. A watch assembly provided by the present invention, compared with the prior art, has the following advantages.

1. According to the present invention, the case back is mounted to the watch case, and when structures inside the watch case need to be inspected and maintained, the case back can be conveniently opened. It should be noted that gear structures inside the watch case of the present invention are integrated into a detachable mounting assembly, the user can directly disassemble the detachable mounting assembly from the watch case, and then opens the detachable mounting assembly to inspect and maintain the gear structures inside the watch case. Through the design of the solution, the gear structures inside the watch assembly can be mounted and dismounted conveniently, which further facilitates the inspection and maintenance of the gear structures inside the watch assembly.

2. According to the present invention, through the cooperation of the rotating assembly, the first drive assembly and the second drive assembly, the hour hand dial and the time reading module can be driven to rotate relative to each other, to achieve the purpose of indicating the time; and through the arrangement of wearing assemblies, the watch assembly can be worn around a wrist of a user.

3. According to the present invention, through the arrangement of the first clamping assembly, the second clamping assembly and the third clamping assembly, the first clamping assembly can allow the first gear and the hour hand dial together to be clamped and fixed together, the second clamping assembly can allow one end of the rotating rod to be clamped with one side of the first bevel gear, and the third clamping assembly can allow the first connecting seat and the second connecting seat to be clamped and fixed together. The first clamping assembly and the second clamping assembly are both convenient for the user to disassemble the detachable mounting assembly from the watch case, and the third clamping assembly can open the first connecting seat and the second connecting seat so that a maintenance person can disassemble and inspect gears on an inner wall of the watch assembly.

In the FIGURES: 1. watch case; 2. case back; 3. minute hand dial; 4. first indicating portion; 5. hour hand dial; 6. second indicating portion; 7. time reading module; 8. movement module; 9. mounting seat; 10. star-shaped pointer; 11. transparent cover plate; 12. first drive shaft; 13. second drive shaft; 14. first gear; 15. second gear; 16. first clamping block; 17. first clamping groove; 18. third gear; 19. fourth gear; 20. connecting hole; 21. crown; 22. rotating rod; 23. first bevel gear; 24. second bevel gear; 25. through hole; 26. limiting block; 27. limiting groove; 28. second clamping block; 29. second clamping groove; 30. first connecting seat; 31. second connecting seat; 32. accommodating groove; 33. elastic buckle; 34. third clamping groove; 35. disassembly groove; 36. mounting lug; 37. mounting hole; 38. mounting rod; 39. watch strap; 40. watch strap hole; 41. buckle piece; 42. strap retaining loop; 43. inserting rod; 44. inserting hole; 45. auxiliary sliding rod; 46. auxiliary sliding groove.

DETAILED DESCRIPTION OF THE EMBODIMENTS

The technical solutions of the embodiments of the present invention are clearly and completely described below with reference to the accompanying drawings in the embodiments of the present invention. Apparently, the described embodiments are merely some rather than all of the embodiments of the present invention. The specific embodiments described herein are merely intended to explain the present invention, but not to limit the present invention. Based on the embodiments in the present invention, all other embodiments obtained by those of ordinary skill in the art without making creative labor fall within the scope of protection of the present invention.

Figure 1:
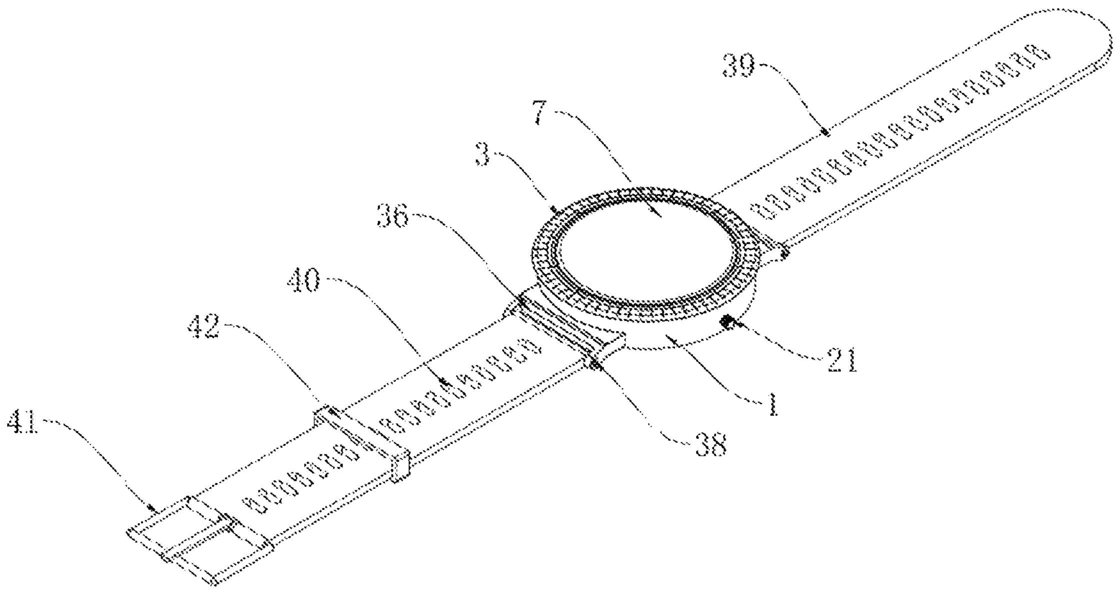
FIG. 1 is a schematic diagram of an overall structure of a watch assembly according to an embodiment of the present invention.
Figure 2:
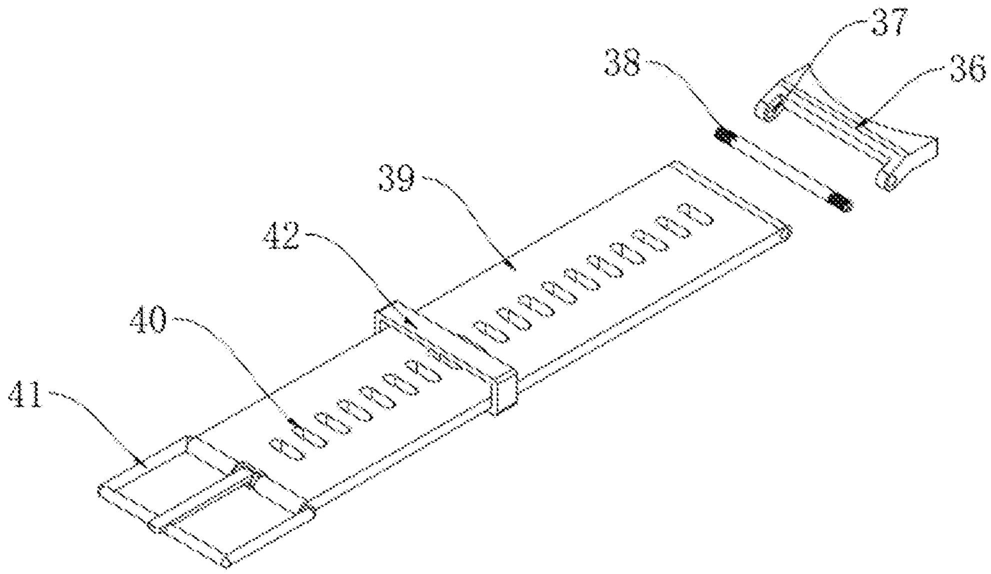
FIG. 2 is a schematic structural diagram of a wearing assembly according to an embodiment of the present invention.
Figure 3:
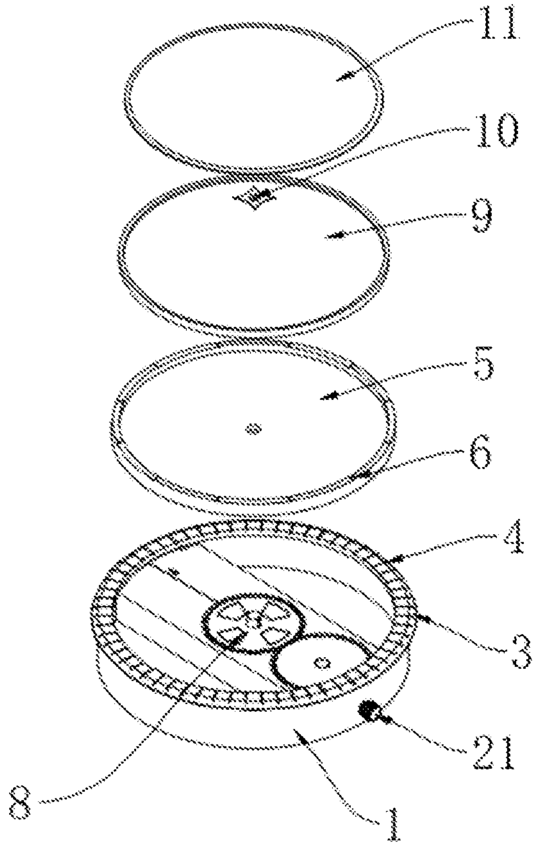
FIG. 3 is a schematic structural diagram of a time reading module according to an embodiment of the present invention.
Figure 4:
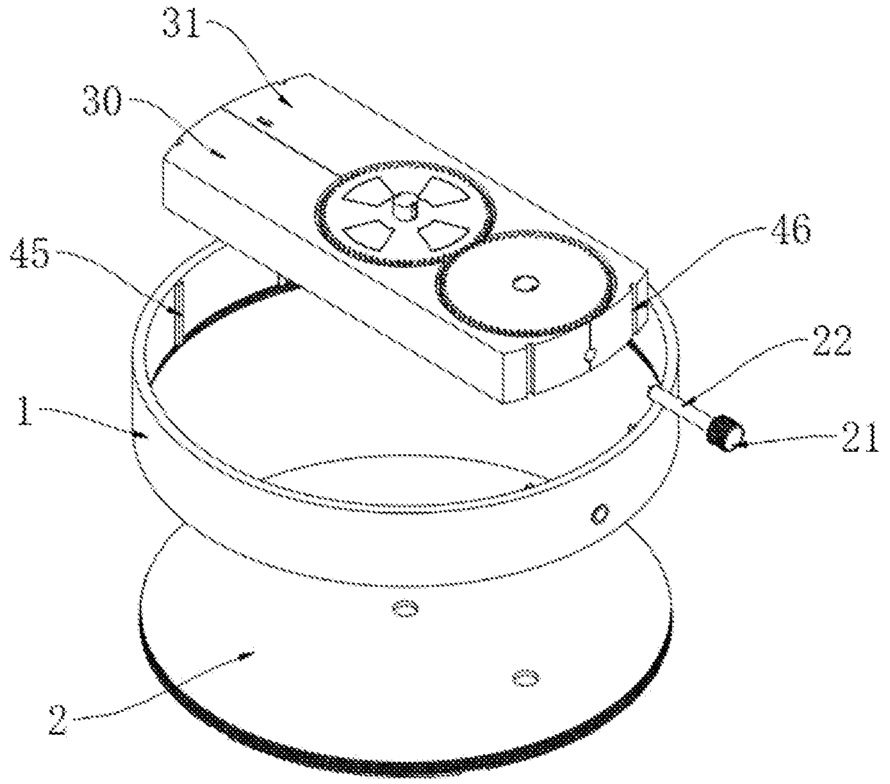
FIG. 4 is a schematic structural diagram of a movement module according to an embodiment of the present invention.
Figure 5:
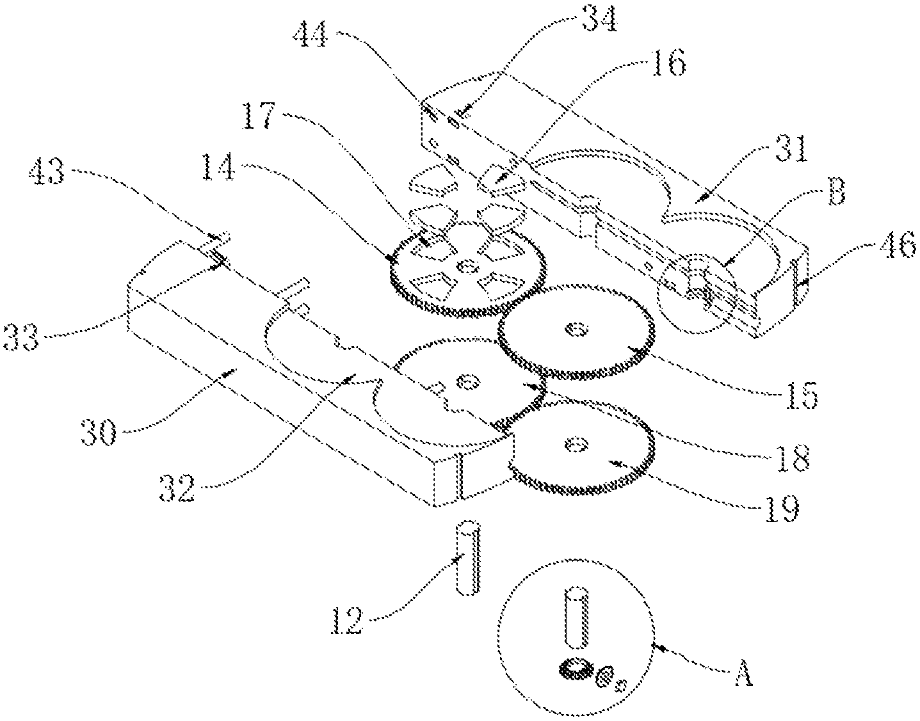
FIG. 5 is a schematic diagram of a split structure of the movement module according to an embodiment of the present invention.
Figure 6:
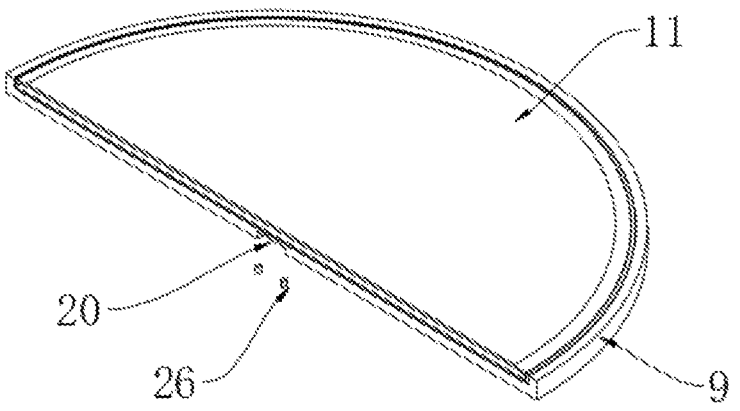
FIG. 6 is a schematic structural diagram of a connecting hole according to an embodiment of the present invention.
Figure 7:
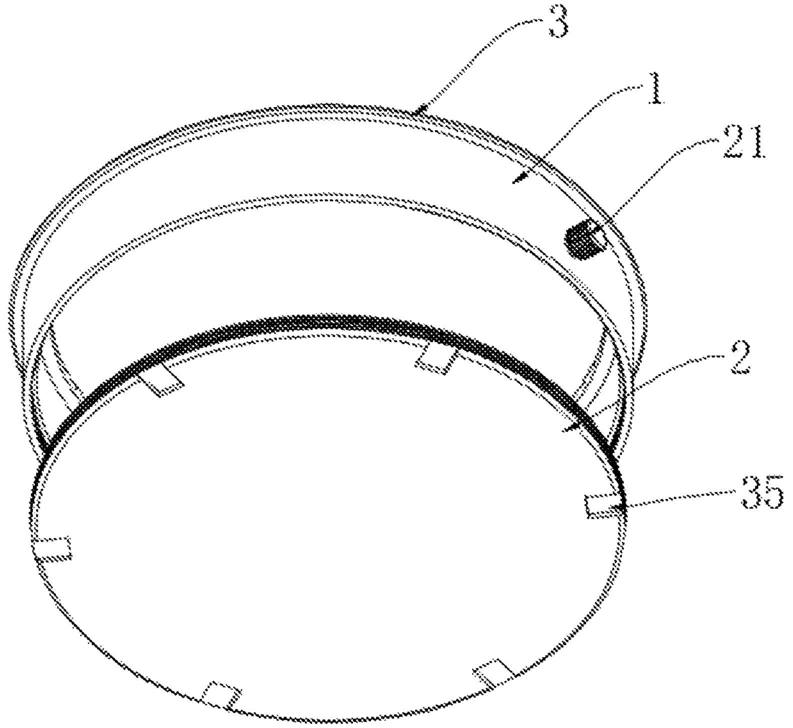
FIG. 7 is a schematic structural diagram of a disassembly groove according to an embodiment of the present invention.
Figure 8:
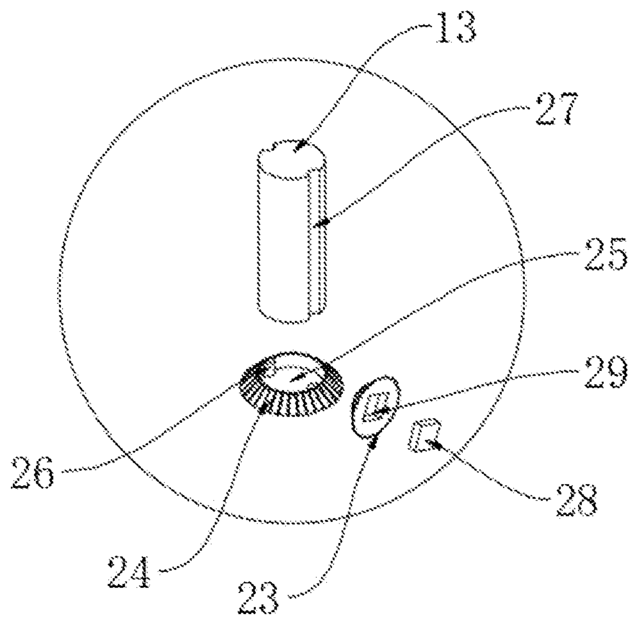
FIG. 8 is an enlarged view of a part A shown in FIG. 5 according to the present invention.
Figure 9:
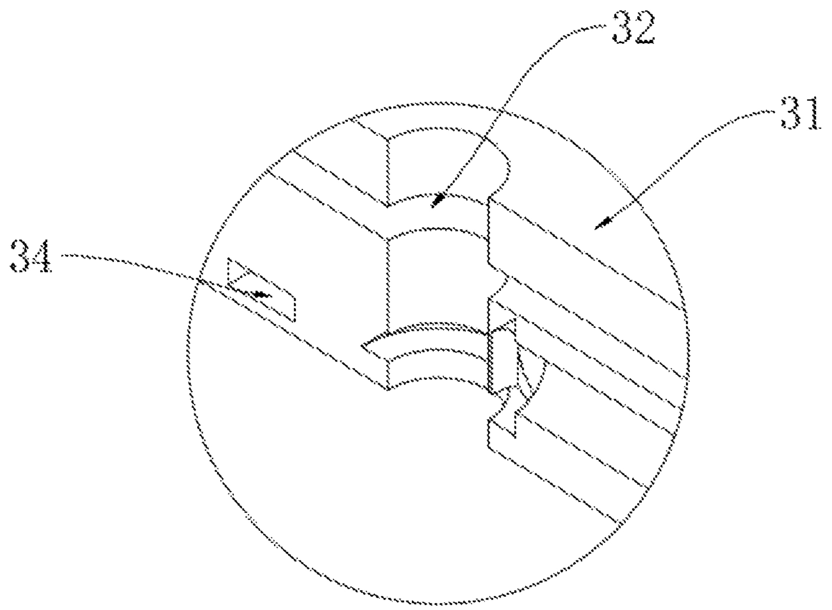
FIG. 9 is an enlarged view of a part B shown in FIG. 5 according to the present invention.

Referring to FIGS. 1 to 9, the present invention discloses a watch assembly, including a watch case 1 and a case back 2 in threaded connection with a bottom of the watch case 1 that can be rotatably opened, several groups of disassembly grooves 35 for rotatably disassembling the case back 2 are symmetrically formed in a bottom of the case back 2. During disassembly, a user may allow a specialized disassembly tool to be clamped into the disassembly grooves 35, and then rotate the tool to disassemble the case back 2 from the bottom of the watch case 1, and wearing assemblies for wearing the watch case 1 around a wrist of the user are mounted on two sides of the watch case 1.

Preferably, the wearing assembly includes mounting lugs 36 fixedly mounted on two sides of the watch case 1, where mounting holes 37 are formed in the mounting lugs 36, mounting rods 38 are in threaded connection with inner cavities of the mounting holes 37, watch straps 39 are mounted on surfaces of the mounting rods 38, watch strap holes 40 are formed in surfaces of the watch straps 39, a buckle piece 41 is movably connected to one end of one of the watch straps 39, a buckle tongue of the buckle piece 41 is clamped to an inner wall of one of the watch strap holes 40, and a strap retaining loop 42 for tightening the other one of the watch strap 39 is further mounted on the surface of the one of the watch straps 39.

Specifically, when the watch assembly in this embodiment needs to be worn around a wrist of a user, the user can allow the two watch straps 39 to surround around the wrist of the user, and insert one end of one of the watch straps 39 into the buckle piece 41, then tighten the watch strap 39 to enable the watch strap 39 to fit with the wrist of the user, and allow the buckle tongue of the buckle piece 41 to be clamped into the corresponding watch strap hole 40. It should be noted that, the arrangement of the strap retaining loop 42 can play a role in arranging the watch strap 39, thereby preventing one end of the watch strap 39 from being upwarped.

The watch assembly further includes: a minute hand dial 3 mounted inside the watch case 1, where a first indicating portion 4 is equidistantly engraved in a surface of the minute hand dial 3; an hour hand dial 5 rotatably disposed in an inner cavity of the watch case 1, where a second indicating portion 6 is equidistantly engraved in a surface of the hour hand dial 5; a time reading module 7 mounted in the inner cavity of the hour hand dial 5; and a movement module 8 detachably mounted in the inner cavity of the watch case 1. Optionally, the first indicating portion 4 is not necessarily scale marks, and may also be numbers, pictures, or the like.

Through the arrangement of the movement module 8, the time reading module 7 and the dial 5 can be driven to rotate, and through the relative rotation of the time reading module 7 and the hour hand dial 5, a purpose of reading time can be achieved. A direction in which the time reading module 7 points to the first indicating portion 4 and the second indicating portion 6 is current accurate time. Optionally, the second indicating portion 6 is not necessarily scale marks, and may also be numbers, pictures, or the like.

It is worth noting that the movement module 8 includes a first drive assembly for driving the hour hand dial 5 to rotate; a second drive assembly for driving the time reading module 7 to rotate; a rotating assembly for driving the first drive assembly and the second drive assembly to rotate; and a detachable mounting assembly for integrating the rotating assembly, the first drive assembly, and the second drive assembly together to facilitate disassembly and maintenance.

Specifically, through the arrangement of the rotating assembly, the hour hand dial 5 and the time reading module 7 can be driven to rotate by the first drive assembly and the second drive assembly, so that normal operation of the watch assembly is achieved. It should be further noted that the movement module 8 disclosed in the present embodiment is used for correcting and adjusting the time of the watch assembly, the remaining structures, such as a watch winder, for driving a watch assembly to operate normally are inherent structures in an existing watch assembly. Those skilled in the art would have been able to know the specific structures and working principles thereof by checking an operation manual and routine tests. Details are not described herein again.

Further, the time reading module 7 includes a mounting seat 9 rotatably connected to the inner cavity of the hour hand dial 5; a star-shaped pointer 10 mounted on an inner cavity of the mounting seat 9 and deviating from a center position; and a transparent cover plate 11 mounted on a top of the mounting seat 9 and used for protecting the star-shaped pointer 10.

Through the arrangement of the time reading module 7, when the time reading module 7 is driven to rotate by the rotating assembly, the star-shaped pointer 10 also rotates with the mounting seat 9, so that a position of the star-shaped pointer is adjusted. When the star-shaped pointer rotates to a certain position, the user can read time information about the position. Through the arrangement of the transparent cover plate 11, the star-shaped pointer 10 can be protected against dust.

Still further, the first drive assembly includes: a first drive shaft 12 disposed in the inner cavity of the watch case 1, where a top end of the first drive shaft 12 penetrates through the hour hand dial 5 and is clamped to a bottom of the mounting seat 9; a second drive shaft 13 disposed in the inner cavity of the watch case 1; a first gear 14 and a second gear 15 disposed in a fitting manner with the first drive shaft 12 and the second drive shaft 13 respectively, where the first gear 14 and the second gear 15 are meshed with each other; and a first clamping assembly for connecting the first gear 14 and the hour hand dial 5 together so that the hour hand dial 5 is able to rotate following the first drive shaft 12.

Through the arrangement of the first drive assembly, the hour hand dial 5 can be subjected to rotation correction, and the specific steps are as follows:

the user drives the second drive shaft 13 to rotate by using the rotating assembly;

the rotation of the second drive shaft 13 drives the second gear 15 to rotate, and since the second gear 15 is meshed with the first gear 14, the second gear 15 drives the first gear 14 to rotate when rotating; and the hour hand dial 5 is subjected to rotation correction under the driving of the first clamping assembly.

Preferably, the first clamping assembly includes several groups of first clamping blocks 16 fixedly mounted at a bottom of the hour hand dial 5; and a first clamping groove 17 formed in a surface of the first gear 14, where a surface of the first clamping block 16 is clamped to an inner wall of the first clamping groove 17.

Specifically, through the arrangement of the first clamping assembly, the first gear 14 and the hour hand dial 5 can be clamped and fixed together, so that the first gear 14 is able to drive the hour hand dial 5 to rotate when rotating; and the first gear 14 and the hour hand dial 5 are connected in a clamping manner, so that it is convenient for the user to disassemble the movement module 8. When the watch assembly is in normal use, the first clamping groove 17 in the surface of the first gear 14 and the first clamping block 16 at the bottom of the hour hand scale 5 are connected in a clamping manner.

It is worth noting that the second drive assembly includes: a third gear 18 and a fourth gear 19 disposed in a fitting manner with the first drive shaft 12 and the second drive shaft 13 respectively, where the third gear 18 and the fourth gear 19 are meshed with each other; and a connecting hole 20 formed in the bottom of the mounting seat 9 and adapted to the first drive shaft 12, where a top end of the first drive shaft 12 is clamped to an inner wall of the connecting hole 20.

Through the arrangement of the second drive assembly, the time reading module 7 can be driven to rotate. Specifically, when the time reading module 7 is subjected to rotation correction, the user can drive the second drive shaft 13 to rotate by using the rotating assembly, and the rotation of the second drive shaft 13 drives the fourth gear 19 on the surface thereof to rotate. Since the fourth gear 19 is meshed with the third gear 18, when the fourth gear 19 rotates, the first drive shaft 12 is driven to rotate through the third gear 18. The top of the first drive shaft 12 is clamped to the connecting hole 20 at the bottom of the time reading module 7 through limiting grooves 27 and limiting blocks 26. The first drive shaft 12 can drive the time reading module 7 to rotate when rotating, so that the purpose of subjecting the time reading module 7 to rotation correction is achieved.

Further, the rotating assembly includes a crown 21 rotatably connected to an outer side of the watch case 1; a rotating rod 22 mounted on one side of the crown 21; a first bevel gear 23 mounted at one end, away from the crown 21, of the rotating rod 22 by using a second clumping assembly;

and a second bevel gear 24 meshed with the first bevel gear 23, where the second bevel gear 24 and the second drive shaft 13 are mounted in a fitting manner.

Through the arrangement of the rotating assembly, the first drive shaft 12 and the second drive shaft 13 can be driven to rotate. Specifically, when the time of the watch assembly needs to be corrected, the user can drive the rotating rod 22 to rotate by rotating the crown 21. The rotation of the rotating rod 22 drives the second bevel gear 24 to rotate through the first bevel gear 23, which in turn drives the second drive shaft 13 to rotate. The rotation of the second drive shaft 13 drives the first gear 14 and the third gear 18 to rotate through the second gear 15 and the fourth gear 19, which in turn drives the first drives shaft 12 to rotate.

Still further, the watch assembly further includes a through hole 25 formed in surfaces of the first gear 14, the second gear 15, the third gear 18, the fourth gear 19 and the second bevel gear 24, where limiting blocks 26 are fixedly mounted on two sides of inner cavities of the through hole 25 and the connecting hole 20, and limiting grooves 27 adapted to the limiting blocks 26 are formed in surfaces of the first drive shaft 12 and the second drive shaft 13.

Through the cooperation of the limiting blocks 26 and the limiting grooves 27, the first gear 14, the second gear 15, the third gear 18, the fourth gear 19 and the second bevel gear 24 can rotate respectively following the corresponding first drive shaft 12 and second drive shaft 13, and the first gear 14, the second gear 15, the third gear 18, the fourth gear 19 and the second bevel gear 24 are mounted in a clamping manner, which also facilitates the disassembly of the watch assembly.

When the first gear 14, the second gear 15, the third gear 18, the fourth gear 19 and the second bevel gear 24 are mounted, the limiting blocks 26 on an inner wall of the through hole 25 is clamped to the limiting grooves 27 on the surfaces of the first drive shaft 12 and the second drive shaft 13, so that when the first gear 14, the second gear 15, the third gear 18, the fourth gear 19, and the second bevel gear 24 rotate, the first drive shaft 12 and the second drive shaft 13 can be driven to rotate.

It should be noted that the second clamping assembly includes a second clamping block 28 fixedly mounted at one end, away from the crown 21, of the rotating rod 22; and a second clamping groove 29 formed in one side of the first bevel gear 23, where a surface of the second clamping block 28 is clamped to an inner wall of the second clamping groove 29.

Specifically, through the arrangement of the second clamping assembly, one end of the rotating rod 22 can be connected to the first bevel gear 23. During mounting, the user can push the crown 21 in a direction of the first bevel gear 23, the movement of the crown 21 drives the second clamping block 28 to move through the rotating rod 22, and the second clamping block 28 is clamped into an inner cavity of the second clamping groove 29, so that one end of the rotating rod 22 is connected to the first bevel gear 23 and when the crown 21 is rotated, the first bevel gear 23 can be driven to rotate through the rotating rod 22.

Further, the detachable mounting assembly includes: a first connecting seat 30 and a second connecting seat 31 disposed in an inner cavity of the watch case 1; a third clamping assembly for clamping and fixing the first connecting seat 30 and the second connecting seat 31 together; and accommodating grooves 32 formed in inner sides of the first connecting seat 30 and the second connecting seat 31 and adapted to the first gear 14, the second gear 15, the third gear 18, the fourth gear 19, the first bevel gear 23, the second bevel gear 24, the first drive shaft 12, the second drive shaft 13 and the rotating rod 22.

Through the arrangement of detachable mounting assembly, the gear structures inside the watch assembly can be mounted and disassembled conveniently. During mounting, the user may mount the first gear 14, the second gear 15, the third gear 18, the fourth gear 19, the first bevel gear 23, the second bevel gear 24, the first drive shaft 12, the second drive shaft 13, and the rotating rod 22 into the accommodating grooves 32 in inner sides of the first connecting seat 30 and the second connecting seat 31, and then, fix the first connecting seat 30 and the second connecting seat 31 together through the third clamping assembly.

Still further, the third clamping assembly includes an elastic buckle 33 fixedly mounted at one side of the first connecting seat 30; and a third clamping groove 34 formed in one side of the second connecting seat 31 and corresponding to the elastic buckle 33, where a surface of the elastic buckle 33 is clamped to an inner wall of the third clamping groove 34.

Specifically, when the first connecting seat 30 and the second connecting seat 31 are closed, movement of the first connecting seat 30 drives the elastic buckle 33 to move in a direction of the third buckle 34. When the first connecting seat 30 and the second connecting seat 31 are fully fitted together, the elastic buckle 33 is clamped into an inner cavity of the third clamping groove 34, so that the first connecting seat 30 and the second connecting seat 31 are clamped and fixed together. Meanwhile, the first gear 14, the second gear 15, the third gear 18, the fourth gear 19, the first bevel gear 23, the second bevel gear 24, the first drive shaft 12, the second drive shaft 13, and the rotating rod 22 can be limited and fixed to inner cavities of the accommodating grooves 32.

It should be further noted that, in this embodiment, an auxiliary support assembly is further disposed between the first connecting seat 30 and the second connecting seat 31 to improve connection stability of the first connecting seat and the second connecting seat. The auxiliary support assembly includes inserting rods 43 fixedly mounted at one side of the first connecting seat 30, inserting holes 44 fitted with the inserting rods 43 are formed in one side of the second connecting seat 31 and at positions corresponding to the inserting rods 43, and one ends of the inserting rods 43 are inserted and connected to inner walls of the inserting holes 44.

Through the arrangement of the auxiliary support assembly, when the first connecting seat 30 and the second connecting seat 31 are mounted together, the inserting rods 43 are inserted into inner cavities of the inserting holes 44, so that the mounting stability of the first connecting seat 30 and the second connecting seat 31 can be improved.

It should be further noted that, in this embodiment, an auxiliary mounting structure is disposed between the watch case 1 and each of the first connecting seat 30 and the second connecting seat 31 to improve the mounting accuracy of the first connecting seat 30 and the second connecting seat 31. The auxiliary mounting structure includes auxiliary sliding rods 45 fixedly mounted at two sides of the inner cavity of the watch case 1, and auxiliary sliding grooves 46 adapted to the auxiliary sliding rods 45 are formed in two sides of the first connecting seat 30 and the second connecting seat 31, and inner walls of the auxiliary sliding grooves 46 are slidably connected to surfaces of the auxiliary sliding rods 45.

After the first connecting seat 30 and the second connecting seat 31 are mounted together, the first gear 14, the second gear 15, the third gear 18, the fourth gear 19, the first bevel gear 23, the second bevel gear 24, the first drive shaft 12, the second drive shaft 13, and the rotating rod 22 are limited and fixed in the inner cavities of the accommodating grooves 32. At this time, the user can mount the first connecting seat 30 and the second connecting seat 31 integrally into the inner cavity of the watch case 1. During mounting, the inner walls of the auxiliary sliding grooves 46 are slidably connected to the surfaces of the auxiliary sliding rods 45, to improve the mounting accuracy and stability of the first connecting seat 30 and the second connecting seat 31. After mounting, the user can screw the case back 2 to the bottom of the watch case 1, so as to fix the movement module 8 in the inner cavity of the watch case 1.

Finally, it should be noted that the foregoing descriptions are merely preferred embodiments of the present invention, but are not intended to limit the present invention. Although the present invention has been described in detail with reference to the foregoing embodiments, those skilled in the art will readily appreciate that they can make modifications to technical solutions recorded in the embodiments described herein, or make equivalents of some of the features described herein. Any modification, equivalent replacement, or improvement made within the spirit and principle of the present invention should be included in the protection scope of the present invention.

What is claimed is:

1. A watch assembly, comprising:
a watch case (1);
a case back (2) mounted in the watch case (1);
a minute hand dial (3) mounted inside the watch case (1), wherein a surface of the minute hand dial (3) is provided with a first indicating portion (4);
an hour hand dial (5) disposed in an inner cavity of the watch case (1), wherein a surface of the hour hand dial (5) is provided with a second indicating portion (6);
a time reading module (7) mounted in an inner cavity of the hour hand dial (5); and
a movement module (8) detachably mounted in the inner cavity of the watch case (1), wherein the movement module (8) comprises:
a first drive assembly for driving the hour hand dial (5) to rotate;
a second drive assembly for driving the time reading module (7) to rotate;
a rotating assembly for driving the first drive assembly and the second drive assembly to rotate; and
a detachable mounting assembly for integrating the rotating assembly, the first drive assembly, and the second drive assembly together to facilitate disassembly and maintenance.

2. The watch assembly according to claim 1, wherein the time reading module (7) comprises:
a mounting seat (9) rotatably connected to the inner cavity of the hour hand dial (5);
a star-shaped pointer (10) mounted on an inner cavity of the mounting seat (9) and deviating from a center position; and
a transparent cover plate (11) mounted on a top of the mounting seat (9) and used for protecting the star-shaped pointer (10).

3. The watch assembly according to claim 2, wherein the first drive assembly comprises:
a first drive shaft (12) disposed in the inner cavity of the watch case (1), wherein a top end of the first drive shaft (12) penetrates through the hour hand dial (5) and is clamped to a bottom of the mounting seat (9);
a second drive shaft (13) disposed in the inner cavity of the watch case (1);
a first gear (14) and a second gear (15) disposed in a fitting manner with the first drive shaft (12) and the second drive shaft (13) respectively, wherein the first gear (14) and the second gear (15) are meshed with each other; and
a first clamping assembly for connecting the first gear (14) and the hour hand dial (5) together so that the hour hand dial (5) is able to rotate following the first drive shaft (12).

4. The watch assembly according to claim 3, wherein the first clamping assembly comprises:
several groups of first clamping blocks (16) fixedly mounted at a bottom of the hour hand dial (5); and
a first clamping groove (17) formed in a surface of the first gear (14), wherein a surface of the first clamping block (16) is clamped to an inner wall of the first clamping groove (17).

5. The watch assembly according to claim 4, wherein the second drive assembly comprises:
a third gear (18) and a fourth gear (19) disposed in a fitting manner with the first drive shaft (12) and the second drive shaft (13) respectively, wherein the third gear (18) and the fourth gear (19) are meshed with each other; and
a connecting hole (20) formed in the bottom of the mounting seat (9) and adapted to the first drive shaft (12), wherein a top end of the first drive shaft (12) is clamped to an inner wall of the connecting hole (20).

6. The watch assembly according to claim 5, wherein the rotating assembly comprises:
a crown (21) rotatably connected to an outer side of the watch case (1);
a rotating rod (22) mounted on one side of the crown (21);
a first bevel gear (23) mounted at one end, away from the crown (21), of the rotating rod (22) by using a second clamping assembly; and
a second bevel gear (24) meshed with the first bevel gear (23), wherein the second bevel gear (24) and the second drive shaft (13) are mounted in a fitting manner.

7. The watch assembly according to claim 6, further comprising: a through hole (25) formed in surfaces of the first gear (14), the second gear (15), the third gear (18), the fourth gear (19) and the second bevel gear (24), wherein limiting blocks (26) are fixedly mounted on two sides of inner cavities of the through hole (25) and the connecting hole (20), and limiting grooves (27) adapted to the limiting blocks (26) are formed in surfaces of the first drive shaft (12) and the second drive shaft (13).

8. The watch assembly according to claim 7, wherein the second clamping assembly comprises:
a second clamping block (28) fixedly mounted at one end, away from the crown (21), of the rotating rod (22); and
a second clamping groove (29) formed in one side of the first bevel gear (23), wherein a surface of the second clamping block (28) is clamped to an inner wall of the second clamping groove (29).

9. The watch assembly according to claim 8, wherein the detachable mounting assembly comprises:
a first connecting seat (30) and a second connecting seat (31) disposed in an inner cavity of the watch case (1);
a third clamping assembly for clamping and fixing the first connecting seat (30) and the second connecting seat (31) together; and
accommodating grooves (32) formed in inner sides of the first connecting seat (30) and the second connecting seat (31) and adapted to the first gear (14), the second gear (15), the third gear (18), the fourth gear (19), the first bevel gear (23), the second bevel gear (24), the first drive shaft (12), the second drive shaft (13) and the rotating rod (22).

10. The watch assembly according to claim 9, wherein the third clamping assembly comprises:

an elastic buckle (33) fixedly mounted at one side of the first connecting seat (30); and a third clamping groove (34) formed in one side of the second connecting seat (31) and corresponding to the elastic buckle (33), wherein a surface of the elastic buckle (33) is clamped to an inner wall of the third clamping groove (34).

* * * * *